United States Patent
Li

(10) Patent No.: US 11,519,364 B2
(45) Date of Patent: Dec. 6, 2022

(54) RIGID THERMAL PROTECTION COMPOSITION

(71) Applicant: THE COMMONWEALTH OF AUSTRALIA, South Australia (AU)

(72) Inventor: Rongzhi Li, South Australia (AU)

(73) Assignee: The Commonwealth of Australia, South Australia (AU)

( * ) Notice: Subject to any disclaimer, the term of this patent is extended or adjusted under 35 U.S.C. 154(b) by 114 days.

(21) Appl. No.: 16/755,030

(22) PCT Filed: Oct. 12, 2018

(86) PCT No.: PCT/AU2018/000194
§ 371 (c)(1),
(2) Date: Apr. 9, 2020

(87) PCT Pub. No.: WO2019/071289
PCT Pub. Date: Apr. 18, 2019

(65) Prior Publication Data
US 2020/0308399 A1    Oct. 1, 2020

(30) Foreign Application Priority Data
Oct. 13, 2017   (AU) .............................. 2017904143

(51) Int. Cl.
| | | |
|---|---|---|
| F02K 9/34 | (2006.01) |
| B29C 43/00 | (2006.01) |
| B29C 43/02 | (2006.01) |
| B29C 70/46 | (2006.01) |
| C08G 18/02 | (2006.01) |
| C08K 3/04 | (2006.01) |
| C08K 3/36 | (2006.01) |
| C08K 7/06 | (2006.01) |
| C08K 13/04 | (2006.01) |
| C08L 75/04 | (2006.01) |
| B29K 105/12 | (2006.01) |
| B29K 307/04 | (2006.01) |
| B29L 31/30 | (2006.01) |

(52) U.S. Cl.
CPC .............. *F02K 9/34* (2013.01); *B29C 43/003* (2013.01); *B29C 43/027* (2013.01); *B29C 70/462* (2013.01); *C08G 18/022* (2013.01); *C08K 3/04* (2013.01); *C08K 3/36* (2013.01); *C08K 7/06* (2013.01); *C08K 13/04* (2013.01); *C08L 75/04* (2013.01); *B29C 70/46* (2013.01); *B29K 2049/00* (2013.01); *B29K 2105/12* (2013.01); *B29K 2307/04* (2013.01); *B29L 2031/3097* (2013.01); *C08K 2201/004* (2013.01); *C08K 2201/005* (2013.01); *C08L 2201/02* (2013.01); *C08L 2205/025* (2013.01)

(58) Field of Classification Search
CPC ..... C08L 75/04; B29C 43/003; B29C 43/027; B29C 70/462; C08G 18/022; C08K 7/06; C08K 13/04; C08K 2201/04; C08K 2201/05; F02K 9/34; B29K 2049/00; B29K 2105/12; B29K 2307/04; B29L 2031/3097
See application file for complete search history.

(56) References Cited

U.S. PATENT DOCUMENTS

| | | |
|---|---|---|
| 3,909,475 A | 9/1975 | Schneider |
| 5,280,706 A | 1/1994 | Yorgason |
| 5,691,402 A | 11/1997 | Anders |
| 6,476,774 B1 | 11/2002 | Davidson et al. |
| 6,548,794 B2 | 4/2003 | Facciano et al. |
| 7,980,057 B2 | 7/2011 | Facciano et al. |
| 8,883,305 B2 | 11/2014 | Steele et al. |
| 9,169,807 B2 | 10/2015 | Dobek et al. |
| 2003/0064228 A1 | 4/2003 | Oosedo et al. |
| 2003/0166744 A1 | 9/2003 | Van Dijk et al. |
| 2004/0028636 A1 | 2/2004 | Collin |
| 2004/0231245 A1 | 11/2004 | Yamamoto et al. |
| 2010/0203787 A1 | 8/2010 | Steele et al. |
| 2012/0128976 A1 | 5/2012 | Steele et al. |
| 2015/0073088 A1 | 3/2015 | Kim et al. |

OTHER PUBLICATIONS

Badrinarayanan et al. "Carbon Fiber-Reinforced Cyanate Ester/Nano-ZrW2O8 Composites with Tailored Thermal Expansion," Applied Materials and Interfaces, 2012, vol. 4, pp. 510-517.
Ganguli et al. "Cyanate Ester Composites Co-Cured with a Silicon-Based Thermal Protection System," High Performance Polymers, 2002, vol. 14, pp. 293-308.
Taha et al. "Preparation and Properties of Fumed Silica/Cyanate Ester Nanocomposites," Chinese Journal of Polymer Science, 2012, vol. 30, No. 4, pp. 530-536.
International Search Report and Written Opinion for International (PCT) Patent Application No. PCT/AU2018/000194, dated Nov. 1, 2018, 9 pages.

*Primary Examiner* — Edward J Cain
(74) *Attorney, Agent, or Firm* — Sheridan Ross P.C.

(57) ABSTRACT

A polymer composite composition for use in high temperature applications such as furnaces, heat shields and aeronautical jet and rocket motors. In a particular application, the disclosed composition is applied to the manufacture of rocket motor cases, or parts thereof, to provide rigid thermal protection (RTP). The polymer composite composition comprises cyanate ester resin, fine lengths of carbon fibre and refractory filler material.

16 Claims, 1 Drawing Sheet

RIGID THERMAL PROTECTION COMPOSITION

CROSS-REFERENCE TO RELATED APPLICATIONS

This application is a national stage application under 35 U.S.C. 371 and claims the benefit of PCT Application No. PCT/AU2018/000194 having an international filing date of 12 Oct. 2018, which designated the United States, which PCT application claimed the benefit of Australian Provisional Patent Application No 2017904143 titled "Rigid thermal protection composition" filed on 13 Oct. 2017, the entire content of each of which are hereby incorporated by reference in their entireties.

TECHNICAL FIELD

The present disclosure relates to a polymer composite composition for use in high temperature applications such as furnaces, heat shields and aeronautical jet and rocket motors. In a particular application, the disclosed composition is applied to the manufacture of rocket motor cases, or parts thereof, to provide rigid thermal protection (RTP).

PRIORITY DOCUMENT

The present application claims priority from Australian Provisional Patent Application No 2017904143 titled "Rigid thermal protection composition" filed on 13 Oct. 2017, the entire content of which is hereby incorporated by reference in its entirety.

INCORPORATION BY REFERENCE

The following publication is referred to in the following description:
M R Kessler in "Cyanate Ester Resins", Wiley Encyclopedia of Composites, 2012.
The content of this publication is hereby incorporated by reference in its entirety.

BACKGROUND

Rockets are a type of high speed aircraft, such as a missile, powered by a reaction type rocket engine or motor which uses chemical energy (through combustion) to achieve thrust by expulsion of exhaust gasses through a nozzle which converts a high pressure low velocity gas into a low pressure high velocity gas. Rocket engines may use either a solid or liquid fuel and generate great heat (eg up to 3500° C.) and internal engine pressure loads. It is therefore essential for rocket performance, and the avoidance of catastrophic failure, that the rocket motor casing is capable of withstanding the stresses caused by such high temperatures and pressures.

Typically, rocket motor casings are produced from metal, which is strong and versatile and generally allows for relatively inexpensive rocket construction. The use of metal such as aluminium alloys and alloys of refractory metals such as tungsten and/or molybdenum, which are lightweight, offer weight savings that can be of considerable importance for rocket construction and performance. However, other materials have been employed and/or investigated for the construction of rocket metal cases, including materials such as ceramics (eg SiCF/SiC ceramic matrices), polymeric materials such as poly-paraphenylene terephthalamide (Kevlar®) and graphite, as well as various composite materials (eg composites using a resin and carbon fibre). Such composite materials may offer advantages in terms of high strength to weight ratio, thereby enabling the potential for additional weight savings in rocket construction. These materials also offer good insensitive munitions properties and high corrosion resistance.

One example of a composite material suitable for rocket motor casing construction is a filament wound-polymer composite material which utilises a high-strength, continuous reinforcing filament, such as graphite, impregnated with a graphite or epoxy resin, and may be formed into the case in a process known as "filament winding" involving the winding of the filament impregnated in the resin about a mandrel of suitable size and dimensions, followed by curing of the resin and removal of the mandrel. However, while such filament wound-polymer composites have been widely used for the manufacture of rocket motor cases, it has been reported that the material may thermally degrade due to friction-generated heat (ie resulting from the friction of air passing over the case at high speed). In addition, the use of filament wound-polymer composite materials also suffers from the disadvantage of a relatively complicated and costly process of manufacture (U.S. Pat. No. 5,280,706).

Accordingly, there is an ongoing need for the identification and development of suitable alternative materials, especially light weight polymer composite materials, for the manufacture of rocket motor casings and other uses in high temperature applications requiring rigid thermal protection.

SUMMARY

In a first aspect, the present disclosure provides a mouldable polymer composite composition comprising:
(i) cyanate ester resin;
(ii) fine lengths of carbon fibre; and
(iii) refractory filler material.

In a second aspect, the present disclosure provides a case, or a part thereof, for a rocket motor produced by moulding and curing a composition according to the first aspect.

Further, in a third aspect, the present disclosure provides a method of producing a rocket motor case, or part thereof, comprising:
moulding a composition according to the first aspect into a desired shape; and
curing the composition.

DETAILED DESCRIPTION

Figure 1:
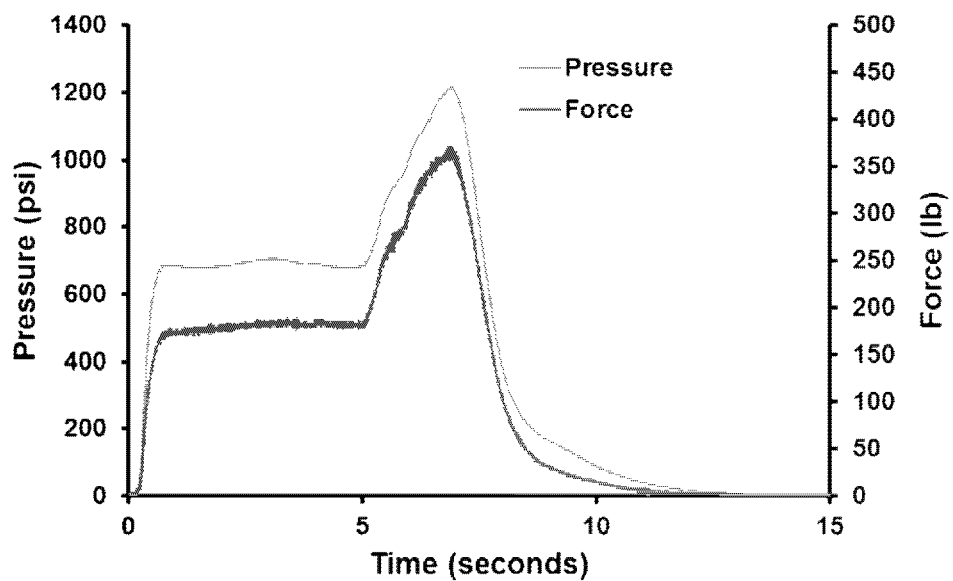
FIG. 1 provides graphical results obtained from a BATES ground rocket test firing using an aft insulator produced from a polymer composite composition according to the present disclosure. The conditions of the firing were: propellant—integrated high payoff rocket propulsion technology (IHPRPT) Phase II, burn time—7.4 seconds, max pressure—1215 psi, propellant mass—7.46 $lb_m$.

Rigid thermal protection (RTP) parts of a rocket motor and the rocket motor case are crucial components of rockets, bearing mechanical loading of rocket maneuvering and providing insulation to the rocket motor, rocket motor case, enclosures and joints from the high temperature flame of rocket firing. The present applicant sought to produce a lightweight polymer composite composition for use in the manufacture of rocket motor cases which would provide RTP and exhibit one or more other beneficial properties. To assist in the manufacture, desirably the composition would also be readily mouldable using, for example, standard compression moulding apparatus and techniques.

A novel polymer composite composition is herein disclosed which comprises cyanate ester resin including fine ("chopped") lengths of carbon fibre and silica powder for RTP of rocket motors. The composition may be readily compression moulded into a rocket motor case, or part(s) thereof. Torch tests conducted on a model rocket motor case part produced from the composition and test firings of a rocket (15 lb BATES ground rocket) incorporating the model part, have shown that the composition provides suitable levels of performance. In particular, it was observed that the model part provided suitable levels of endurance, residual strength and charring behaviour; that is, the carbon present in the model part produced char rather than ash, and the charred model part showed suitable levels of residual strength (and retained its shape and geometry). The model part was also of a desirable light weight that was estimated to be no more than 90% of the weight of a comparable porous ceramic part and no more than 60% of the weight of a comparable part produced from an aluminium alloy.

In a first aspect, the present disclosure provides a mouldable polymer composite composition comprising:
  (i) cyanate ester resin;
  (ii) fine lengths of carbon fibre; and
  (iii) refractory filler material.

Preferably, the composition comprises the components (i), (ii) and (iii) in a weight ratio of 75-100:5-50:5-50 (resin:carbon fibre:filler). In preferred embodiments of such a composition, the composition is compression mouldable using, for example, standard compression moulding apparatus and techniques.

More preferably, the composition comprises the components (i), (ii) and (iii) in a resin:carbon fibre:filler weight ratio of 90-100:10-30:10-30. Again, in preferred embodiments of such a composition, the composition is compression mouldable using, for example, standard compression moulding apparatus and techniques.

Still more preferably, the composition comprises the components (i), (ii) and (iii) in a resin:carbon fibre:filler weight ratio of 90-100:5-15:10-35. Once again, in preferred embodiments of such a composition, the composition is compression mouldable using, for example, standard compression moulding apparatus and techniques.

In some particular embodiments of the composition, the components (i), (ii) and (iii) are present in a resin:carbon fibre:filler weight ratio of 100:10:10, 100:10:20, 100:10:30, or 100:10:32.

The cyanate ester resin may comprise one or more cyanate ester resin materials. Cyanate ester resins are a class of thermosetting polymers which typically show high glass-transition temperatures (e.g. a $T_g$ of greater than 250° C.), low outgassing, and low dielectric constant and loss. Their production, structures and properties are reviewed by M R Kessler in "Cyanate Ester Resins", Wiley Encyclopedia of Composites, 2012 (DOI: 10.1002/9781118097298.weoc062), which is incorporated herein in its entirety by reference.

In some preferred embodiments, the cyanate ester resin is selected from those that have a glass transition temperature of greater than 250° C., more preferably greater than 275° C. Examples of such resins include the Primaset® cyanate ester resins available from Lonza Ltd, which are characterised by $T_g$ values of up to about 400° C. Particularly suitable examples of Primaset® cyanate ester resins include LeCy (with a $T_g$ of 295° C.) and PT-30 (with a $T_g$ of 400° C.), which may be used in specific embodiments of the composition either alone or in combination (e.g. where they might be used in a weight ratio in the range of 5:95 (PT-30:LeCy) to 95:5, but more preferably 25:75 to 75:25). In one particularly preferred embodiment, the cyanate ester resin is a blend of PT-30 and LeCy in a weight ratio of about 50:50, to achieve a desirable balance of viscosity and high $T_g$.

The carbon fibre is present in the composition in the form of fine fibre lengths. For example, the carbon fibre material may be provided with individual fibre lengths varying in length from about 1 mm to about 50 mm, more preferably about 3 mm to about 30 mm. The average fibre length may be, for example, about 3 mm or about 10 mm. The fine lengths of carbon fibre may be prepared by routine methods such as simply chopping carbon fibre using a knife, shears or diagonal cutter. The carbon fibre may be selected from the wide range of commercially available carbon fibre products. Preferred carbon fibre includes those which can be readily combined with thermosetting resins such as those with compatible sizing. In one particularly preferred embodiment, the fine lengths of carbon fibre are prepared from a continuous carbon fibre product such as Hexcel® AS4 carbon fibre (12000 filaments, 0.858 g/m) (Hexcel Corporation, Stamford, Conn., United States of America), but other products such as HexTow® IM7 (Hexcel Corporation) and TorayCA®T700 (Toray Carbon Fibers America, Inc., Santa Ana, Calif., United States of America) and the like, would also be suitable.

The refractory filler material may comprise one or more filler substances. Such substances will typically show little or no damage when exposed to heating up to at least about 1500° C. Suitable filler substances for use in the composition of the present disclosure may therefore include clays (eg kaolins), silica, fine titanium dioxide particles, graphite, dolomite, bauxite and various carbides, and mixtures thereof. In some preferred embodiments, the refractory filler material comprises or consists of silica. Preferred silicas may include pyrogenic silica (also known as fumed silica) powders comprising silica microparticles and/or nanoparticles. In some particularly preferred embodiments, the refractory filler material comprises pyrogenic silica comprising hydrophilic and/or amorphous particles that, substantially, are less than 50 μm (eg when sieving produces a sieve residue >50 μm that is less than 5%, more preferably less than 1% of the material) or, more preferably, less than 40 μm (eg when sieved produces a sieve residue >40 μm that is less than 5%, more preferably less than 1% of the material). Examples of particularly preferred pyrogenic silica include Wacker HDK® N20 and Aerosil® R150 (Evonik Industries, Essen, Germany). Preferably, the particles of the pyrogenic silica powder will be of a size in the range of 5 to 30 nm.

The composition of the present disclosure may include additional components such as catalysts (resin hardeners) and other materials such as a suitable catalyst solvent. Typically, the components (i), (ii) and (iii) together will comprise at least 90%, preferably at least 98%, by weight of the total weight of the composition. By itself, the cyanate ester resin (component (i)) may comprise at least 45%, more preferably at least 55%, and still more preferably at least 65%, by weight of the total weight of the composition.

As indicated above, the composition may be suitable for a range of high temperature applications such as in the manufacture of heat shields (eg for use in spacecraft, semi-automatic or automatic rifles and various exhaust heat management purposes), structural elements of high temperature furnaces or items used in such furnaces (eg trays, shelves and furnace baskets), and fire retardant structural assembly boards (eg fire-proof cladding). However, the composition is particularly intended for use in the manufacture of rocket motor cases or part(s) thereof. Generally, rocket motor cases take the form of a central cylindrical section with end caps known as domes, and may or may not further comprise one or more insulator liner(s). The composition of the present disclosure may be used to manufacture a complete rocket motor case, or substantially a complete rocket motor case, or otherwise may be used to manufacture one or more parts thereof (eg the central cylindrical section, one or more of the end cap domes, and/or one or more insulator liners such as an aft dome insulator ("aft insulator")).

Thus, in a second aspect, the present disclosure provides a case, or a part thereof, for a rocket motor produced by moulding and curing a composition according to the first aspect.

Further, in a third aspect, the present disclosure provides a method of producing a rocket motor case, or part thereof, comprising:

moulding a composition according to the first aspect into a desired shape; and curing the composition.

The composition provides rigid thermal protection (RTP) of the rocket motor.

Preferably, the rocket motor case or part thereof is moulded by compression moulding.

In some preferred embodiments, the rocket motor case (or part thereof) is suitable for use with a small solid rocket motor (eg a BATES standard rocket motor). The rocket motor case (or part thereof) may be suitable for, for example, wing mounted, bay-mounted or container launched solid rocket motor (SRM) applications.

In some preferred embodiments, the part is an aft insulator.

The composition of the present disclosure, and its applications, is hereinafter further described by way of the following non-limiting example and accompanying figures.

EXAMPLES

Example 1 Preparation of a Cyanate Ester Resin-Based Composition, Compression Moulding and Testing of Cured Product for Solid Rocket Application A cyanate ester (CE) resin-based composition was prepared for compression moulding. This composition comprised two cyanate ester resins (namely, Primaset® PT-30 and LeCy cyanate ester resins; Lonza Ltd, Basel, Switzerland)), chopped carbon fibre (fibre lengths of 3 to 30 mm)(Hexcel® AS4 carbon fibre; 12000 filaments, 0.858 g/m; Hexcel Corporation, Stamford, Conn., United States of America), nanometre-sized amorphous silica powder (eg Wacker HDK® N20 fumed silica; Wacker Chemie AG, Munich, Germany), and a catalyst (ie hardeners).

Materials and Methods

The composition was blended at a weight ratio of resins:fine carbon fibre:silica of 100:10:32 in the following manner.

(i) The two CE resins were blended together at a ratio of 50:50 by weight until the blend became homogeneous without air bubbles. The blend was then heated and/or de-gassed in a vacuum oven if necessary.

(ii) A catalyst solution was prepared by mixing (while stirring) copper (II) acetylacetonate catalyst (CAS Number 13395-16-9) in nonylphenol solvent (CAS Number 84852-15-3). Stirring was maintained until the solution became homogeneous without solid residual. If necessary, the solution was heated to achieve homogeneity. The catalyst solution comprised a concentration of 5 to 50 parts of copper acetylacetonate to 1000 parts of nonylphenol solvent by weight (ie a solution of 0.5 to 5 wt % copper acetylacetonate).

(iii) The catalyst solution was then mixed into the CE resin blend with stirring until the mixture became homogeneous without solid residual. The mixture was heated to achieve homogeneity if necessary. The weight ratio of the catalyst solution to CE resin blend used was 2 parts of copper acetylacetonate solution to 100 parts of the CE resin blend. The ratio can be adjusted if desired in view of the catalyst solubility and resin cure cycle, viscosity and/or other considerations, noting that generally, a high catalyst concentration effects a fast resin cure cycle and a shorter resin solidification time.

(iv) Finely chopped carbon fibre (prepared by chopping the AS4 carbon fibre with a knife to fibre lengths of 3 to 30 mm) was then immediately added into the catalyst solution-CE resin blend mixture and gently stirred until the fibre was uniformly dispersed. The weight ratio of chopped carbon fibre (CCF) used was typically in the range of 10 to 30 parts to 100 parts of the catalyst solution-CE resin blend by weight (ie 10 to 30 wt % of the chopped carbon fibre). The ratio may be adjusted if required and in view of the fibre length, blending quality, viscosity and/or other considerations. Generally, shorter length carbon fibres (eg 3 to 10 mm in length) can be mixed in at higher concentrations to achieve higher strength if desired.

(v) Next, the silica powder was added, and the mixture thereafter kneaded by hand, or with a kneading tool or machine, until all of the CCF and powder solids were uniformly dispersed to produce the final composition for compression moulding. The silica powder was typically provided at a concentration of 10 to 30 parts to 100 parts of the CCF-catalyst solution-CE resin blend by weight (ie 10 to 30 wt % of the silica powder). The concentration of the silica powder may be adjusted to provide a desired total solids (ie CCF and silica powder) content and/or in view of parameters such as blending quality, powder size and/or other considerations. Generally, the total solids (ie CCF and silica powder) content will be in the range of from about 30 to about 50 wt % of the total weight of the composition.

(vi) Based upon the size (volume) of the part to be moulded and the theoretical density of the final cured product, a calculation of the required weight of the final composition is made. If needed, 10 to 20 grams more may be added to the calculated part weight to arrive at the final composition (ie dough) weight needed to be added to the compression mould.

The composition was compression moulded into a desired part shape (particularly, a BATES motor aft insulator, and test sample parts in the shape of a disk 50 mm in diameter and 6.35 mm thick) using standard compression moulding apparatus and techniques. The moulding started when the mould was closed at 1 to 5 MPa pressure. The following cure cycle was used:

Ramp from room temperature (RT) to 150° C. at 5° C. per minute;
Isothermal at 150° C. for 1 minute;
Ramp from 150° C. to 210° C. at 5° C. per minute;
Increase compression pressure to 10 to 30 MPa;
Isothermal at 210° C. for 6 to 24 hours; and
Cool down at maximally 3° C. per minute to 60° C.

The cure cycle may be adjusted as required. Generally, higher cure temperature and/or more copper acetylacetonate catalyst will shorten the required cure cycle.

The void ratio of less than 3% was acceptable.

The cured products were tested for their ability to provide rigid thermal protection (RTP) in a solid rocket application using standard protocols and parameter measurements (eg density measurement, tensile strength testing, short beam shear strength testing, torch testing (ie flame resistance at simulated rocket heat flux of >5 MW/m$^2$), BAllistic Test and Evaluation System (BATES) CHAR firing (ie measurement of erosion rate in BATES rocket firing) and aft insulator firing).

Results and Discussion

Figure 2:
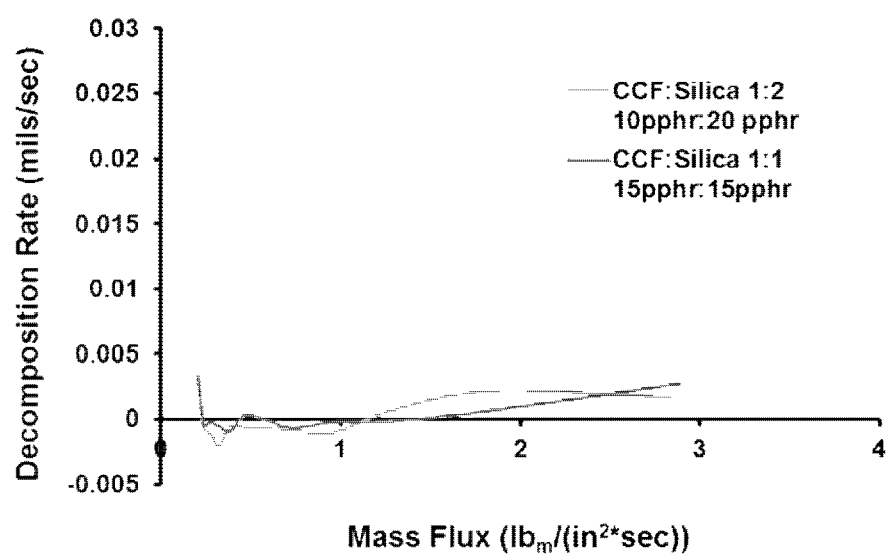
FIG. 2 provides graphical results showing decomposition rates of two aft insulators, produced from polymer composite compositions according to the present disclosure, during a BATES ground rocket test firing. The two aft insulators comprised different ratios of chopped carbon fibres (CCM) and pyrogenic silica as indicated.

Results achieved with the aft insulators produced in accordance with the present disclosure are shown in FIGS. 1 and 2.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The term "about" means within an acceptable range for the particular value as determined by those skilled in the art, which will depend in part on how the value is measured or determined (e.g. the limitations of the measurement system). For example, "about" can mean a range of up to 20%, preferably up to 10%, more preferably up to 5%, and more preferably still up to 1% of a given value.

Where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the scope of the disclosure, subject to any specifically excluded limit in the stated range. Where the stated range includes one or both of the limits, ranges excluding either both of those included limits are also included within the scope of the disclosure.

All ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those skilled in the art. This includes, at very least, the degree of expected experimental error, technique error and instrument error for a given technique used to measure a value.

Where used herein, the term "and/or" when used in a list of two or more items means that any one of the listed characteristics can be present, or any combination of two or more of the listed characteristics can be present. For example, if a composition is described as containing characteristics A, B, and/or C, the composition can contain A feature alone; B alone; C alone; A and B in combination; A and C in combination; B and C in combination; or A, B, and C in combination.

The reference to any prior art in this specification is not, and should not be taken as, an acknowledgement of any form of suggestion that such prior art forms part of the common general knowledge.

It will be appreciated by those skilled in the art that the present disclosure is not restricted in its use to the particular application described. Neither is the present disclosure restricted in its preferred embodiment with regard to the particular elements and/or features described or depicted herein. It will be appreciated that the present disclosure is not limited to the embodiment or embodiments disclosed, but is capable of numerous rearrangements, modifications and substitutions without departing from the scope set forth and defined by the following claims.

The invention claimed is:

1. A mouldable polymer, blended composite composition comprising:
   (i) cyanate ester resin;
   (ii) fine lengths of carbon fibre; and
   (iii) refractory filler material,
wherein the carbon fibre is present in the composition in a form of individual fine fibre lengths and wherein the individual fibre lengths vary in length from about 1 mm to about 50 mm.

2. The composition of claim 1, wherein components (i), (ii) and (iii) are present in a weight ratio of 75-100:5-50:5-50 (resin:carbon fibre:filler).

3. The composition of claim 1, wherein components (i), (ii) and (iii) are present in a weight ratio of 90-100:10-30:10-30 (resin:carbon fibre:filler).

4. The composition of claim 1, wherein components (i), (ii) and (iii) are present in a weight ratio of 90-100:5-15:10-35 (resin:carbon fibre:filler).

5. The composition of claim 1, wherein the composition is compression mouldable.

6. The composition of claim 1, wherein the cyanate ester resin is a blend of PT-30 and LeCy resins.

7. The composition of claim 1, wherein the individual fibre lengths vary in length from about 3 mm to about 30 mm.

8. The composition of claim 1, wherein the refractory filler material comprises silica.

9. The composition of claim 1, wherein the refractory filler material comprises pyrogenic silica comprising hydrophilic and/or amorphous particles that, substantially, are less than 50 μm.

10. The composition of claim 1, wherein components (i), (ii) and (iii) together comprise at least 90% by weight of the total weight of the composition.

11. The composition of claim 10, wherein by itself, the cyanate ester resin (component (i)) comprises at least 45% by weight of the total weight of the composition.

12. A case, or a part thereof, for a rocket motor produced by moulding and curing a composition according to claim 1.

13. The part of claim 12, wherein the part is a central cylindrical section of a rocket motor, an end cap dome of a rocket motor or an insulator liner for a rocket motor case.

14. The part of claim 13, wherein the part is an aft dome insulator.

15. A method of producing a rocket motor case, or part thereof, comprising:
   moulding a composition according to claim 1 into a desired shape; and curing the composition.

16. The method of claim 15, wherein the moulding is conducted by compression moulding.

\* \* \* \* \*